Figure 1:
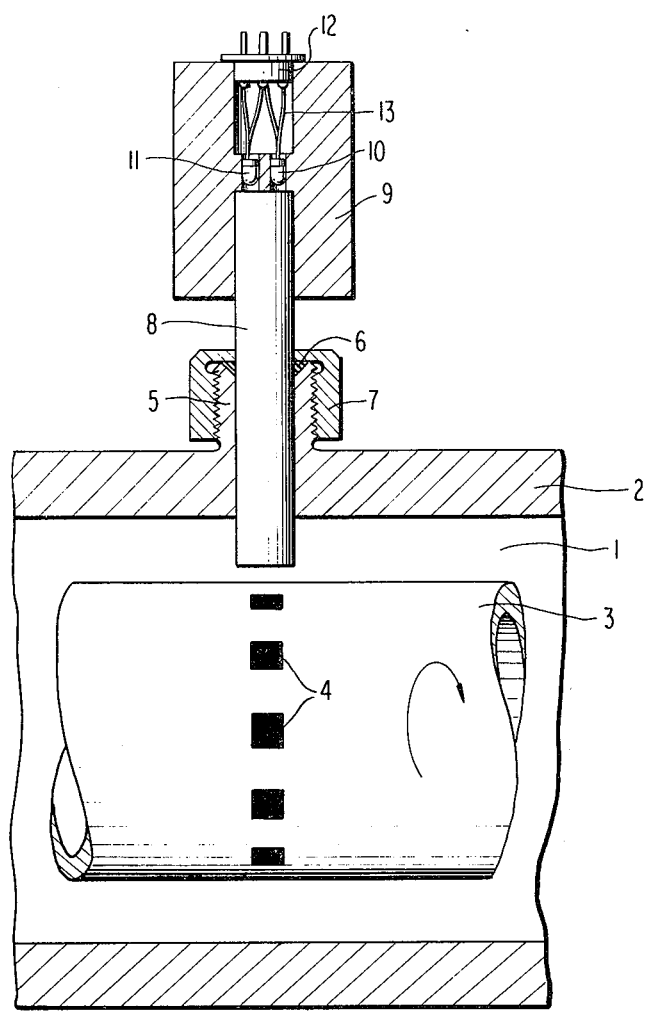

United States Patent [19]

Schurrer

[11] 3,961,184

[45] June 1, 1976

[54] DEVICE FOR PHOTOELECTRIC MEASUREMENTS OF MOVING PARTS

[75] Inventor: Josef Schurrer, Munich-Karlsfeld, Germany

[73] Assignee: Maschinenfabrik Augsburg-Nurnberg AG, Germany

[22] Filed: Mar. 3, 1972

[21] Appl. No.: 231,489

[30] Foreign Application Priority Data

Mar. 3, 1971 Germany.............................. 2110017

[52] U.S. Cl............................. 250/231 R; 250/227; 350/96 R
[51] Int. Cl.$^2$........................................... G01D 5/30
[58] Field of Search ............. 50/218, 231, 227, 236; 350/96 R, 96 B; 356/41

[56] References Cited
UNITED STATES PATENTS

| | | | |
|---|---|---|---|
| 2,256,595 | 9/1941 | Metcalf.............................. | 250/227 |
| 2,415,436 | 2/1947 | Maris................................ | 250/231 X |
| 2,838,683 | 6/1958 | Munro............................... | 250/227 |
| 3,068,742 | 12/1962 | Hicks, Jr. et al..................... | 356/41 |
| 3,071,976 | 1/1963 | Kunz.................................. | 250/231 X |
| 3,307,164 | 2/1971 | Zimmer............................ | 250/236 X |
| 3,564,264 | 2/1971 | Karuhn.............................. | 250/218 |

Primary Examiner—Walter Stolwein
Attorney, Agent, or Firm—Craig & Antonelli

[57] ABSTRACT

Apparatus for photoelectric measurements of a parameter of a movable part such as the rotary speed thereof wherein the part is provided with constrast marks thereon and the light source and the light receiver of the apparatus are not separated by the movable part. The light source and the light receiver are commonly housed in a scanner unit arranged at one end face of a light conductive member, the other end face being positioned proximate to the contrast marks on the movable part such that the light conductive member forms a light beam path for directing light from the light source onto the movable part and for directing reflected light from the movable part to the light receiver. For measurements required within a chamber, the light conductive member extends through a passage in the casing of the chamber which passage may be arranged radially or axially of the chamber and is secured within the passage, which may effect a vacuum-tight seal for vacuum-tight integrity of the chamber, such that the end face carrying the scanner unit is positioned outside of the chamber while the other end face is positioned within the chamber.

19 Claims, 2 Drawing Figures

DEVICE FOR PHOTOELECTRIC MEASUREMENTS OF MOVING PARTS

The present invention relates to an apparatus for photoelectric measurements on moving parts having marks thereon in which the light source and the light receiver are not separated by the moving part.

Devices for measuring speeds, in particular rotary speeds of a rotating part wherein the speed is reproduced by a corresponding pulse frequency are known. For example, German Patent No. 1,182,871 discloses a typical prior art device utilizing a flashing light stroboscope in which the path scanner is of the conventional type. As disclosed in this patent, the light from the light source is directed through masks and lenses onto a path marked with printed symbols from which it is reflected to a photocell. In this manner a desired photoelectric measurement is obtained.

The aforedescribed prior art types of path scanners have proven to be unsuitable, in particular for parts which are arranged for movement within a chamber, due to mechanical as well as optical requirements. For example, failure of the moved part, e.g. of a shaft or drum rotating at critical speed under vacuum conditions, would result in destruction of the photoelectric device. Moreover, adjustments of the light source angle and the light receiver angle are required which complicates the mechanical and optical structure of the device as well as necessitating a very complicated measuring procedure. Furthermore, the aforedescribed known apparatus suffers from considerable irradiation by external light resulting in a very high sensitivity losses between the scanner and moved part and inaccuracy in measurement.

It is therefore an object of the present invention to provide an apparatus for photoelectric measurements of a movable part which overcomes the disadvantages of prior art devices.

It is another object of the present invention to provide a photoelectric measurement apparatus for use on movable parts which provides a high degree of safety in the case of destruction of the moved part during the measurement such as may occur with a gas centrifuge rotor under vacuum conditions.

It is another object of the present invention to provide a photoelectric measurement apparatus for movable parts having high measurement accuracy.

In accordance with the present invention, the photoelectric measurement apparatus includes a scanner unit commonly housing a light source and a light receiver, and a single light conducting member having the scanner unit at one of its end faces forming a light beam path for directing light onto a movable part, a parameter such as the speed of rotation of which is to be measured, and for receiving reflected light from the movable part for transmission to the light receiver of the scanner unit.

This arrangement provides an advantage in that due to the total reflection characteristics of the light conductive member, only a very small angle of aperture is formed at the front face of the light conductor which leads to minimum irradiation by external light. The common light conductor also permits the maintenance of sensitivity losses at a minimum, even in cases where relatively great distances exist between scanner and moved part. Another advantage of the invention consists in that the scanner unit may be rapidly replaced during a measurement operation, e.g. in case of a lamp failure, without the necessity of interrupting the test or adjusting the angle between light source and light receiver. Thus, also a continuous longitudinal adjustment of the light conductor is possible.

According to a preferred embodiment of the invention, the light conductor protrudes, radially or axially, into a chamber housing the moving part which is vacuum-tight enclosed by a casing, the scanner unit being arranged outside of said chamber.

Such an arrangement is particularly advantageous in the case of failure of the moving part, since the complete photoelectric scanner unit will all other electrical installations therefor cannot be destroyed, as they are protected by the casing. Another feature of the invention consists in that a single sealing and clamping ring (O-ring) is provided for axial location and sealing of the conductor in the casing.

According to a further feature of the invention, the light conductive member is a rod-shaped light conductor, manufactured, in a manner known per se, of a material of high light permeability, e.g. an acrylic glass such as Plexiglas. In addition, the light conductor may be formed in such a way as to permit focusing of the light beams during lighting and/or reflection as, for example, by shaping the ends of the light conductor.

In order to route the light beams on a bent path, the light conductor is, according to a further construction, composed of several media of differing refraction of light. In this case, the rod-shaped light conductor preferably consists of several prisms. The formation of a bent path may also be achieved by an arrangement of flexible light conductive rods forming a single light conductive member.

Figure 2:
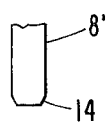

These and further objects, features and advantages of the present invention will become more obvious from the following description when taken in connection with the accompanying drawing which shows, for purposes of illustration only, one embodiment in accordance with the present invention, and wherein:

FIG. 1 is a partial cut-away schematic cross-sectional view of a photoelectric measuring apparatus for measuring a parameter such as speed of rotation of a moving part within a vacuum-tight enclosure in accordance with the present invention, and FIG. 2 is a partial view of a light conductive rod having an end face shaped for focusing.

Referring now to FIG. 1 of the drawing, reference numeral 1 designates an evacuated chamber surrounded by a cylindrical casing 2. A rotor 3 is arranged for rotation within the chamber and has provided upon the outer circumferential area thereof contrast marks 4. The casing is provided with a radially extending passage about which a threaded neck portion 5 is provided, the neck portion extending from the casing circumference. An O-ring seal is arranged at the face of the neck 5 and a clamping nut 7 is provided for compressing the O-ring to obtain a seal. The radial passages of the integrally threaded neck of the casing and of the clamping nut are arranged to receive a rod-shaped light conductor 8 formed of a material of high light permeability, for example, an acrylic glass such as Plexiglas. The light conductor together with the threaded neck 5, the O-ring 6 and the clamping nut 7 serve for ensuring the vacuum-tight integrity of the chamber.

As shown in FIG. 1, the light conductor 8 has one end face disposed within the chamber 1 at a position immediately above the contrast marks 4 such that upon rotation of the rotor 3, the marks pass below the beam path of the light conductor. At the other end face of the light conductor a scanner unit 9 is attached. The scanner unit includes a light source 10 which may be a bulb as is conventional in the art, and a light receiver or detector 11 which may be a photoelectric semiconductor, the light source and light receiver being arranged at the other face of the light conductor 8. The light source and light receiver are thus commonly housed in the scanner and are arranged such that light rays directly from the light source are not detected by the receiver. The scanner also includes electrical connecting lines shown schematically at 13 connecting a plug 12 of the scanner to the light source and light detector. In this manner, power as well as other electrical input and output signals can be supplied to or taken from the scanner via the plug 12.

It can thus be seen that the light conductor 8 provides a beam path for transmitting light onto the rotor 3 and for receiving reflected light therefrom which is detected by the light receiver 11 in the conventional manner to provide an indication of a parameter of the rotor 3 such as the speed thereof. The scanner thus operates in the manner of conventional systems for providing photoelectric measurements of moving parts having contrast marks provided thereon. With this arrangement, the scanner unit 9 is protected from destruction, for example, due to an explosion of the rotating part within the chamber. Although the light conductor, which extends into the chamber, would be destroyed by such an explosion, it is easily replaceable and the scanner unit remains unharmed. Additionally, with this arrangement the vacuum-tight integrity of the chamber 1 is maintained while obtaining high measurement accuracy. Furthermore, by use of a light conducting rod for the light beam transmission and reflection path, there is no requirement for adjusting the angles of transmission and reflection as in conventional systems and the attendant loss in accuracy due to external irradiation of the beam paths.

It should be noted that while only one embodiment in accordance with the present invention has been illustrated, it is understood that the same is not limited thereto but is susceptible of numerous changes and modifications as known to those skilled in the art. For example, it is obvious that the light conductor can be arranged axially of the chamber in such a manner that it will direct light against the face of a test object. Additionally, the light conductor may be composed of several portions of differing light refracting characteristics to route the light beams on a bent path. Also, the ends 14 of the light conductor 8 may be suitably shaped for focusing of the light beams as shown in FIG. 2. I therefore do not wish to be limited to the details shown and described herein, but intend to cover all such changes and modifications as are encompassed by the scope of the appended claims.

I claim:

1. Apparatus for photoelectrical measurements of a movable part having contrast marks provided thereon comprising a photoelectric scanning means having a housing, said scanning means including a light source means and a light detecting means arranged within the housing, and a single light conductive means having said scanning means arranged at one end face thereof and another end face thereof being arranged in the region of the contrast marks on the movable part, said single light conductive means forming a beam path for directing light from the light source to the movable part and for directing reflected light from the movable part to the light detector, said single light conductive means including at least one light conducting member having a center line extending between opposite end faces of said member, substantially all parts of said member being arranged for simultaneously transmitting light from the light source to the movable part and reflected light from the movable part to the light detector in respective opposite directions through said member and the opposite end faces thereof.

2. Apparatus for photoelectrical measurements as defined in claim 1, further comprising means for positioning said light conductive means relative to the movable part.

3. Apparatus for photoelectrical measurements as defined in claim 2, wherein said positioning means includes a casing for housing the movable part, said casing forming a vacuum-tight sealed chamber having a passage therein through which said light conductive means extends, the end face of said light conductive means having the scanning means arranged thereon being positioned exteriorly of the chamber, and the other end face being arranged within the chamber proximate to the movable part.

4. Apparatus for photoelectrical measurements as defined in claim 3, wherein said passage extends radially of said casing and said light conductive means extends therethrough.

5. Apparatus for photoelectrical measurements as defined in claim 3, wherein said passage extends axially of said casing and said light conductive means extends therethrough.

6. Apparatus for photoelectrical measurements as defined in claim 3, wherein said positioning means includes a sealing and clamping O-ring arranged at the passage through which said light conducting means extends.

7. Apparatus for photoelectrical measurements as defined in claim 1, wherein said light conducting member is a light conductive rod formed of a material of high light beam permeability.

8. Apparatus for photoelectrical measurements as defined in claim 7, wherein the ends of said rod are shaped for focusing the light beam during at least one of the directing of light to the movable part and the directing of the reflected light therefrom.

9. Apparatus for photoelectrical measurements as defined in claim 7, wherein said light conductive rod is formed of several positions having differing refraction of light characteristics.

10. Apparatus for photoelectrical measurements as defined in claim 1, wherein said scanning means is displaceably arranged at the face of said light conductive means such that the scanning means may be replaced during a measuring operation.

11. Apparatus for photoelectrical measurements as defined in claim 3, wherein said light conducting member is a light conductive rod formed of a material of high light beam permeability.

12. Apparatus for photoelectrical measurements as defined in claim 3, wherein the ends of said rod are shaped for focusing the light beam during at least one of the directing of light to the movable part and the directing of the reflected light therefrom.

13. Apparatus for photoelectrical measurements as defined in claim 11, wherein said light conductive rod is formed of several portions having differing refraction of light characteristics.

14. Apparatus for photoelectrical measurements as defined in claim 3, wherein said scanning means is displaceably arranged at the face of said light conductive means such that the scanning means may be replaced during a measuring operation.

15. Apparatus for photoelectrical measurements as defined in claim 8, wherein said light conductive rod is formed of several portions having differing refraction of light characteristics.

16. Apparatus for photoelectrical measurements as defined in claim 6, wherein said positioning means includes a threaded neck portion integrally formed with said casing and extending outwardly therefrom, said neck portion forming an extension of said passage through said casing, said O-ring being arranged on the face of said neck portion and a clamping nut being mounted on said neck portion for compressing said O-ring for axially positioning and sealing said light conductive means extending through said passage with respect to said casing.

17. Apparatus for photoelectrical measurements as defined in claim 1, wherein said single light conductive means has a longitudinal extending axis and permits simultaneous directing of light from the light source to the movable part and directing of reflected light to the light detector in the axial direction thereof.

18. Apparatus for photoelectrical measurements as defined in claim 17, wherein said single light conductive means is a one-piece light conductive rod.

19. Apparatus for photoelectrical measurements as defined in claim 1, wherein the movable part has a curved surface with the contrast marks on said surface, said light conductive means having the another end face thereof positioned proximate to the curved surface.

* * * * *